(12) United States Patent
Desai

(10) Patent No.: US 7,308,529 B1
(45) Date of Patent: Dec. 11, 2007

(54) EFFICIENT MOUNTING AND DISMOUNTING OF STORAGE MEDIA

(75) Inventor: Ravindranath S. Desai, Mountain View, CA (US)

(73) Assignee: EMC Corporation, Mountain View, CA (US)

( * ) Notice: Subject to any disclaimer, the term of this patent is extended or adjusted under 35 U.S.C. 154(b) by 414 days.

(21) Appl. No.: 10/882,651

(22) Filed: Jun. 30, 2004

(51) Int. Cl.
*G06F 12/00* (2006.01)
(52) U.S. Cl. ........................ 711/111; 711/151
(58) Field of Classification Search ............. None
See application file for complete search history.

(56) References Cited

U.S. PATENT DOCUMENTS 4,987,533 A * 1/1991 Clark et al. ............... 707/204
5,566,348 A * 10/1996 Dahman et al. ............ 710/18
5,983,318 A * 11/1999 Willson et al. ............. 711/113
6,295,179 B1 * 9/2001 Taniai et al. ................ 360/92

* cited by examiner

*Primary Examiner*—Reginald Bragdon
*Assistant Examiner*—Ngoc Dinh
(74) *Attorney, Agent, or Firm*—Van Pelt, Yi & James LLP

(57) ABSTRACT

A technique for processing a request requiring that a first volume of removable storage media be mounted on a storage device is disclosed. It is determined whether the storage device is available. In the event it is determined that the storage device is not available because it currently has mounted on it a second volume of removable storage media associated with a data mover, it is determined whether the data mover should be asked to permit the second volume to be removed from the storage device so that the first volume can be mounted thereon. In the event it is determined that the data mover should be asked to permit the second volume to be removed from the storage device so that the first volume can be mounted thereon, the data mover is prompted to provide an indication that the second volume may be dismounted from the storage device.

52 Claims, 7 Drawing Sheets

EFFICIENT MOUNTING AND DISMOUNTING OF STORAGE MEDIA

CROSS REFERENCE TO RELATED APPLICATIONS

This application is related to co-pending U.S. patent application Ser. No. 10/883,624 entitled PRIORITIZATION AND QUEUING OF MEDIA REQUESTS filed concurrently herewith, which is incorporated herein by reference for all purposes.

This application is related to pending U.S. patent application Ser. No. 10/737,715 entitled AUTOMATED MEDIA MANAGEMENT filed Dec. 16, 2003, which is incorporated herein by reference for all purposes.

FIELD OF THE INVENTION

The present invention relates generally to removable storage media. More specifically, efficient mounting and dismounting of storage media is disclosed.

BACKGROUND OF THE INVENTION

Fully or partially automated media libraries, sometimes referred to herein as "libraries" or "robots", are available to store and manipulate removable storage media, such as tapes used to store computer data for backup or archive purposes. A typical library may be equipped with a robotic or other mechanism for manipulating the media stored therein, such as by inserting a selected volume or unit of the media (e.g., a particular tape) into a read/write device associated with the unit, e.g., a tape drive configured to write data to and/or read data from the media. In the computer network environment, e.g., a backup application (sometimes referred to herein as "data mover") may be used to store data from one or more computers or other devices connected to the network (sometimes referred to herein as network "nodes" or "hosts") on storage media associated with a library.

A request may be made to perform operations such as mounting (installing) a specified tape on a designated drive or removing a tape from a drive (sometimes referred to herein as "dismounting" a tape). When an operation involving a tape is complete, the tape may be dismounted from the drive via a "lazy dismount". The system is configured to wait a predetermined period of time ("lazy wait period") before physically removing the tape from the drive. During this period, the tape remains in the drive, even though it is not actively being used, and the drive is said to be in a "lazy dismount state." The lazy dismount may be advantageous because in the event a subsequent request requiring use of the same tape in the same drive is serviced while the tape remains in the drive during a lazy dismount period, there is no need to remount the tape back in the drive. However, the lazy dismount also can result in inefficiencies. For example, when a drive is in the lazy dismount state, there may be another request to use that drive that is unnecessarily held up by the lazy dismount period. Such lazy dismount periods can add up over time and contribute to a backlog of requests in a queue, for example. There is a need for a way to overcome the inefficiencies that may be associated with a lazy dismount.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Efficient mounting and dismounting of storage media is disclosed. In particular, preemptively dismounting storage media is disclosed. When a request to preemptively dismount a media volume from a storage device is received, it is determined whether an operation associated with the storage device is complete. If the operation is complete, a request is sent to dismount the media volume. In one embodiment, if the operation is not complete, the operation is suspended or aborted when possible.

Figure 1A:
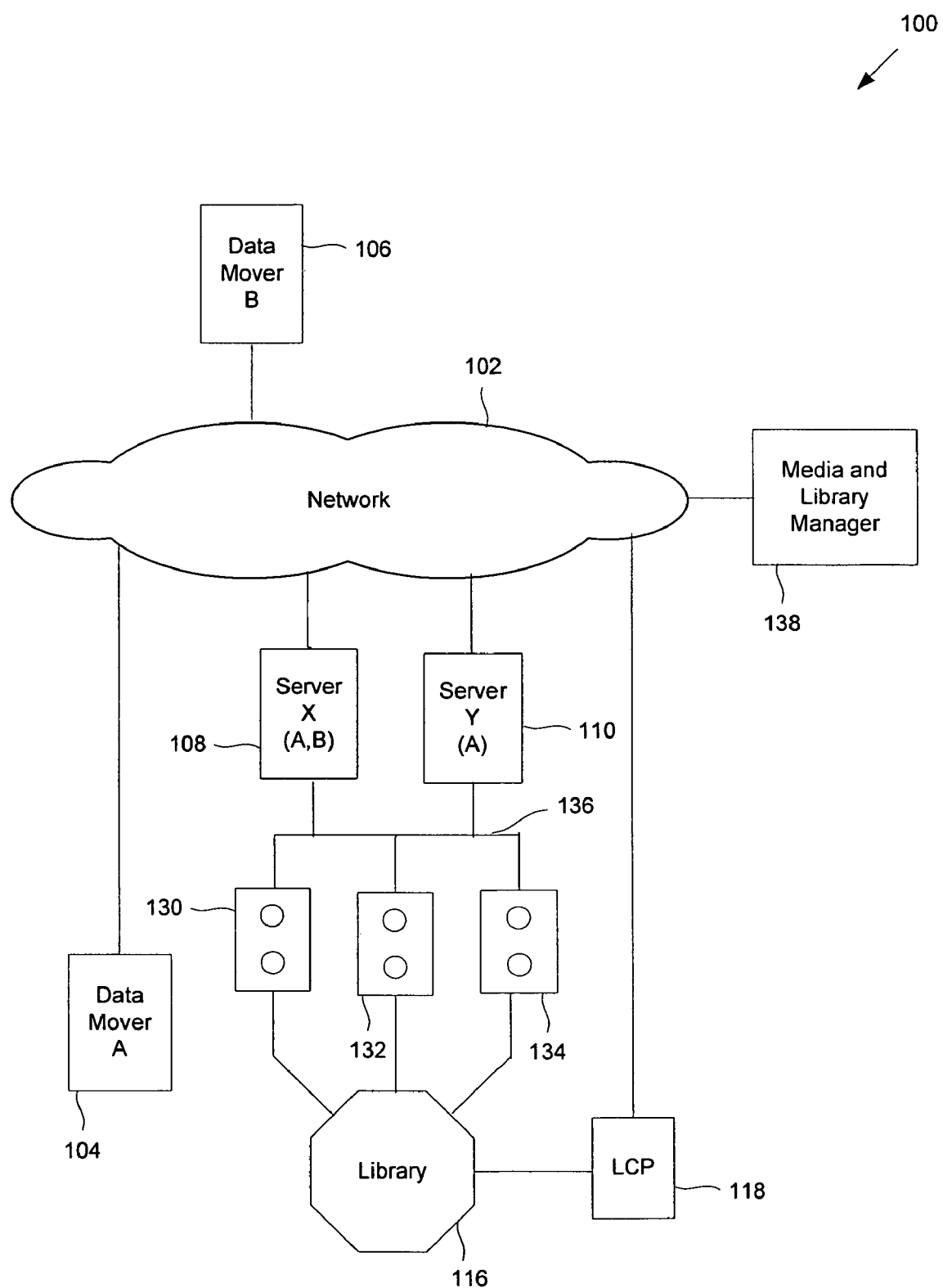
FIG. 1A is a block diagram illustrating one exemplary embodiment of a network environment and a media management system.

FIG. 1A is a block diagram illustrating one exemplary embodiment of a network environment and a media management system. The system 100 comprises a network 102, which may be a local area network (LAN) or any type of private or public network. The system 100 further comprises servers A, B, X, and Y, identified by reference numerals 104, 106, 108, and 110, respectively, in FIG. 1A, connected to network 102. In the example shown in FIG. 1A, a first backup application, such as the NetWorker™ backup application available commercially from the Legato Software Division of EMC Corporation, is installed on server A (104), and a second backup application is installed on server B (106). The first and second backup applications may be the same or different products. In one embodiment, the backup application is a distributed application, and a portion of the backup application (i.e., a data mover agent) is installed on server A (104). The data on server X (108) is backed up by both the first backup application installed on server A (104) and the second backup application installed on server B (106), as is indicated in FIG. 1A by the letters "A" and "B" in parentheses below the letter "X". Such a configuration may be used, e.g., to provide two independent backups for particularly critical data, or where separate data mover programs are each responsible for backing up a separate set of data on the same server. Server Y (110) is backed up by the first backup application installed on server A (104). Server A may likewise comprise a body of data that is backed up by operation of the first backup application installed on server A, and server B may comprise a body of data that is backed up by operation of the second backup application installed on server B. The storage media used by the first and second backup applications installed on servers A and B, respectively, reside in storage media library 116. Storage media library 116 may be of any type. For example, storage media library 116 may be a SCSI library configured to be controlled directly by a library host 118 via a small computer systems interface (SCSI) connection. Storage media library 116 may instead be an ACSLS library, which is an automated cartridge system library software-controlled library of the type available commercially from StorageTechnology Corporation (StorageTek) of Louisville, Colo. An ACSLS-type library is controlled using a software controller provided for that purpose, as opposed to being controlled directly by the library host. Library host 118 is connected to and configured to control library 116. Library host 118 also is connected to network 102. While examples of a SCSI and ACSLS type library are described, any number or combination of types of libraries may be used, including without limitation IBM 3494, ADIC AML, and/or any other type of library. Library 116 has associated with and connected to it tape drives 130, 132, and 134. Tape drives 130, 132, and 134 are connected to servers X (108) and Y (110) via a storage area network (SAN) 136. SAN 136 makes it possible for each of servers X and Y to read from or write to any one of the SAN-connected tape drives 130, 132, and 134.

A media and library manager (MLM) 138 coordinates operations between the first backup application running on server A and the second backup application running on server B, such as by receiving and arbitrating between potentially competing requests for resources associated with library 116, as well as executing such requests. For example, the MLM may receive requests from the backup applications that a particular tape residing in the library be inserted into a tape drive. The MLM may provide other functionality, such as keeping track of tapes stored in the library and elsewhere. MLM 138 has a connection to the network 102, which it uses to communicate with other nodes connected to network 102 as described more fully below. MLM 138 may comprise a server connected to network 102.

As described in U.S. patent application Ser. No. 10/737, 715, which is incorporated by reference above, in some embodiments, a library control program (LCP) is installed on library host 118. An LCP is a software agent configured to control a library to be managed by an MLM. The LCP could reside on any host that has a controller connection (e.g., SCSI) the library. Similarly, a drive control program (DCP) is installed on servers 108 and 110 in some embodiments. A DCP is a software agent configured to control a storage device (e.g., a tape drive) to be managed by an MLM. The DCP could reside on any host that has a controller connection (e.g., SCSI) to one or more storage devices. The system could include more than one LCP and more than one DCP, as needed.

Each of servers A, B, X, and Y may comprise different hardware and/or may be running a different operating system (or version thereof). In addition, the type of media stored in library 116 may vary. Also, certain elements may be connected to an associated tape device differently than others. For example, servers X and Y are connected to tape drives 130, 132, and 134 via a SAN, while servers A and B may have direct SCSI connections to other tape drives to which they are connected (not shown).

Figure 1B:
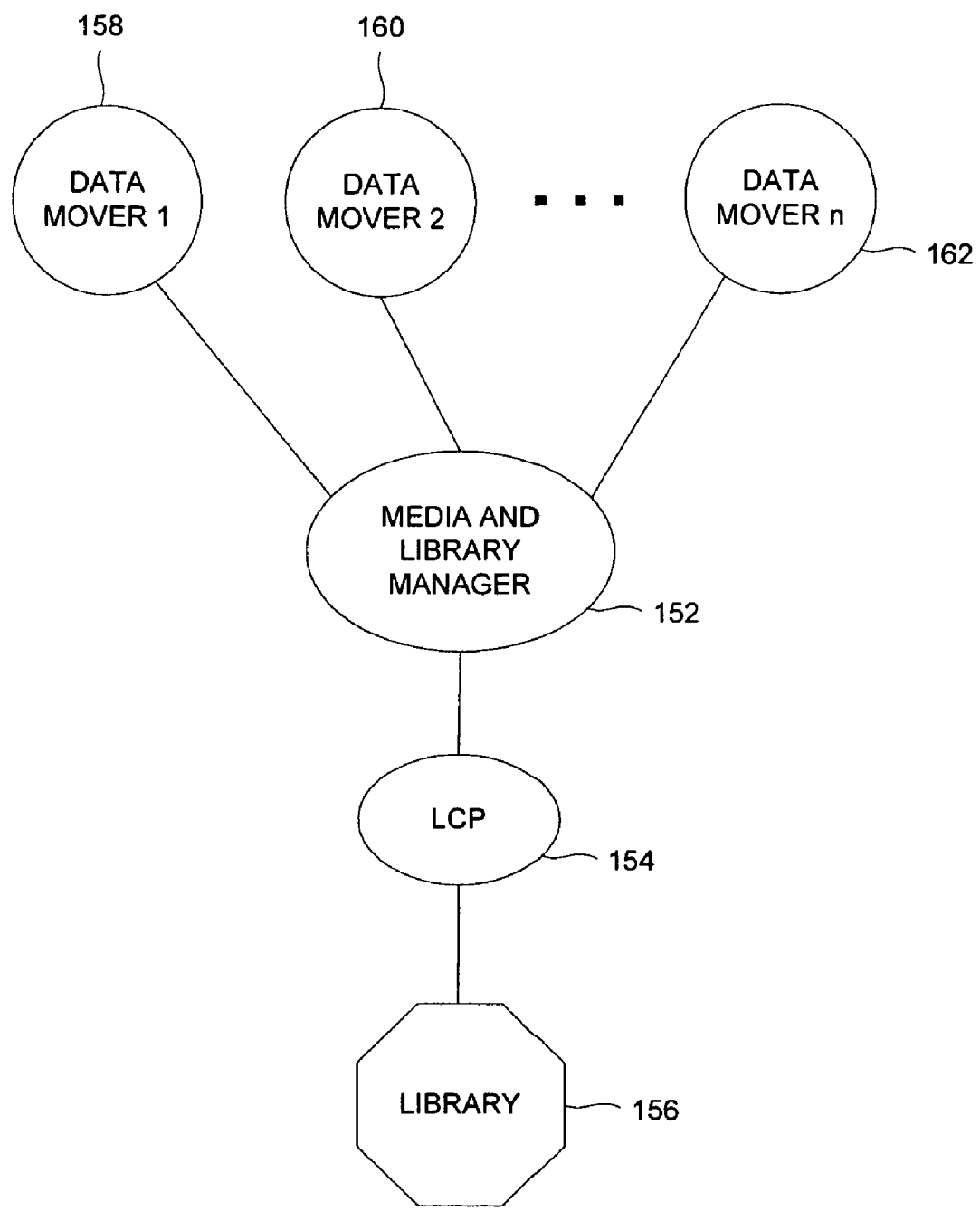
FIG. 1B is a schematic diagram showing the relationship between the media and library manager, the data movers, and the library and associated resources in one embodiment.

FIG. 1B is a schematic diagram showing the relationship between the media and library manager, the data movers, and the library and associated resources in one embodiment. In the example shown, the media and library manager 152 is configured to control the library 156 via the LCP 154. A plurality of data movers 1 to n, represented in FIG. 1B by data movers 158, 160, and 162, each has an interface to the media and library manager, which each uses to send requests for resources and/or operations by the library 156 to the media and library manager 152. The media and library manager 152 services the requests, arbitrating between conflicting requests for the same resource. Using an architecture such as the one shown in FIG. 1B simplifies the development and quality assurance process associated with developing a data mover application, e.g., by enabling the developer to create a single interface to the media and library manager, instead of having to develop a separate hardware interface for each type of library or other resource the data mover application may be required to be configured or configurable to control if the data mover were to be expected to control such libraries or other resources directly, as opposed to relying on the media and library manager to perform such functions. In the approach shown, a hardware interface would have to be developed and validated through a quality assurance process for each type of library, for example, only for the media and library manager 152, and not separately for each data mover application. The approach illustrated in FIG. 1B also facilitates the role of the media and library manager in arbitrating between conflicting or competing requests from different data movers, as described herein. For example, under the approach shown in FIG. 1B only the media and library manager 152 controls the library 156. If each data mover were able to control the library directly, each would think it "owned" the library during times when it was using the library, which could result in other data movers being locked out of use of the library, even if the other data movers had more urgent requests for resources associated with the library. Under the approach shown, the media and library manager can decide which requests from which data mover(s) will be serviced using which resources and at which time, ensuring that the most important requests are serviced first, as described more fully below.

Figure 1C:
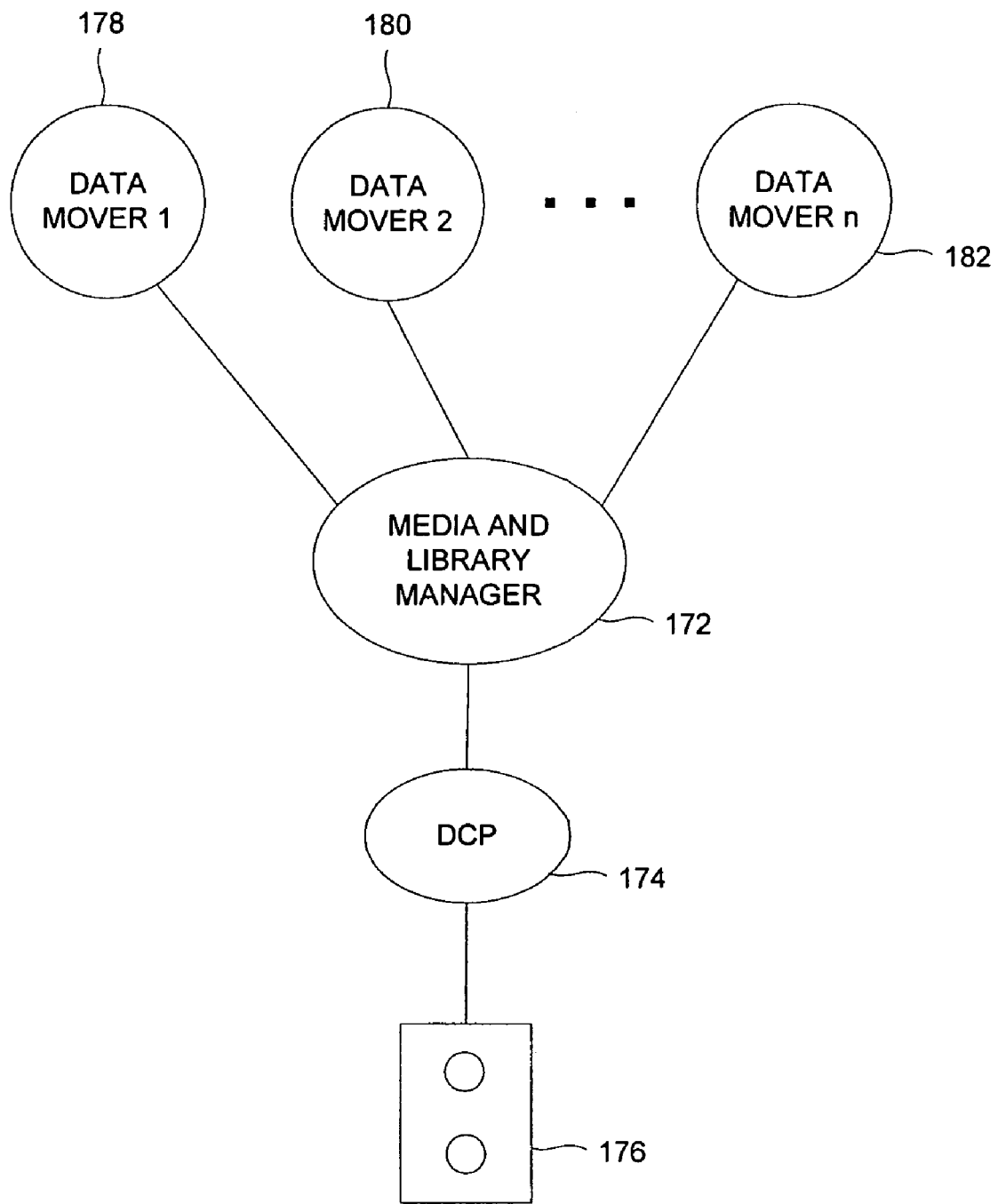
FIG. 1C is a schematic diagram showing the relationship between the media and library manager, the data movers, and a storage device and associated resources in one embodiment.

FIG. 1C is a schematic diagram showing the relationship between the media and library manager, the data movers, and a storage device and associated resources in one embodiment. In the example shown, the media and library manager 172 is configured to control the storage device 176 via the DCP 174. For example, DCP 174 may be configured to communicate with a tape drive via a SCSI connection or a SAN. A plurality of data movers 1 to n, represented in FIG. 1C by data movers 178, 180, and 182, each has an interface to the media and library manager, which each uses to send requests for resources and/or operations by the storage device 176 to the media and library manager 172. The media and library manager 172 services the requests, arbitrating between conflicting requests for the same resource. Using an architecture such as the one shown in FIG. 1C simplifies the development and quality assurance process associated with developing a data mover application, e.g., by enabling the developer to create a single interface to the media and library manager, instead of having to develop a separate hardware interface for each type of storage device or other resource the data mover application may be required to be configured or configurable to control if the data mover were to be expected to control such storage devices or other resources directly, as opposed to relying on the media and library manager to perform such functions. In the approach shown, a hardware interface would have to be developed and validated through a quality assurance process for each type of storage device, for example, only for the media and library manager 172, and not separately for each data mover application. The approach illustrated in FIG. 1C also facilitates the role of the media and library manager in arbitrating between conflicting or competing requests from different data movers, as described herein. For example, under the approach shown in FIG. 1C only the media and library manager 172 controls the storage device 176. If each data mover were able to control the storage device directly, each would think it "owned" the storage device during times when it was using the storage device, which could result in other data movers being locked out of use of the storage device, even if the other data movers had more urgent requests for resources associated with the storage device. Under the approach shown, the media and library manager can decide which requests from which data mover(s) will be serviced using which resources and at which time, ensuring that the most important requests are serviced first, as described more fully below.

Figure 2:
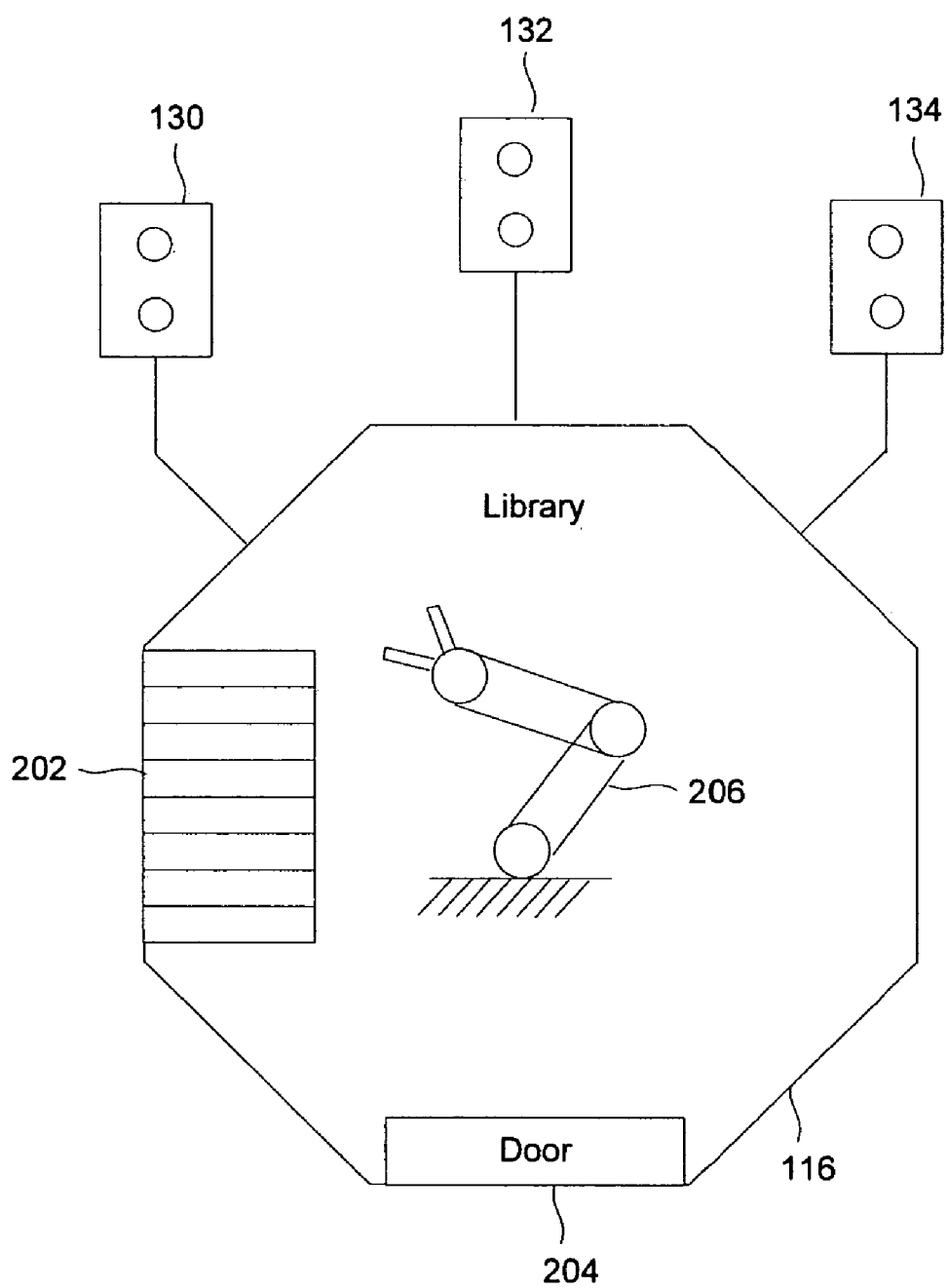
FIG. 2 is a block diagram illustrating one embodiment of a storage media library.

FIG. 2 is a block diagram illustrating one embodiment of a storage media library, such as library 116 from FIG. 1A. In this example, storage media library 116 is shown to include media slots 202, robot 206, and door 204. Other devices not shown that may be included in a library include a printer, a flipper (for multi-sided media), and removable magazines of media, which, similarly to media slots 202, have their own door and can be pulled entirely out of the library. Media slots 202 may, for example, be physical shelves on which media (e.g., tapes) are stored. A particular tape may have a home shelf where it is placed after an operation associated with the tape is completed. Robot 206 is a robotic or other mechanism for manipulating the media, such as by inserting a selected volume or unit of the media (e.g., a particular tape) into a read/write device associated with the library, e.g., a tape drive configured to write data to and/or read data from the media, such as tape drive 130, 132, or 134. Door 204, which may also be referred to as a mailbox or a cap, may be used to import (inject or add) or export (eject or remove) media to or from the library. For example, to archive a set of tapes in the library by storing them in another location, those tapes may be exported to door 204, where an operator can then open the door and remove the tapes.

Figure 3:
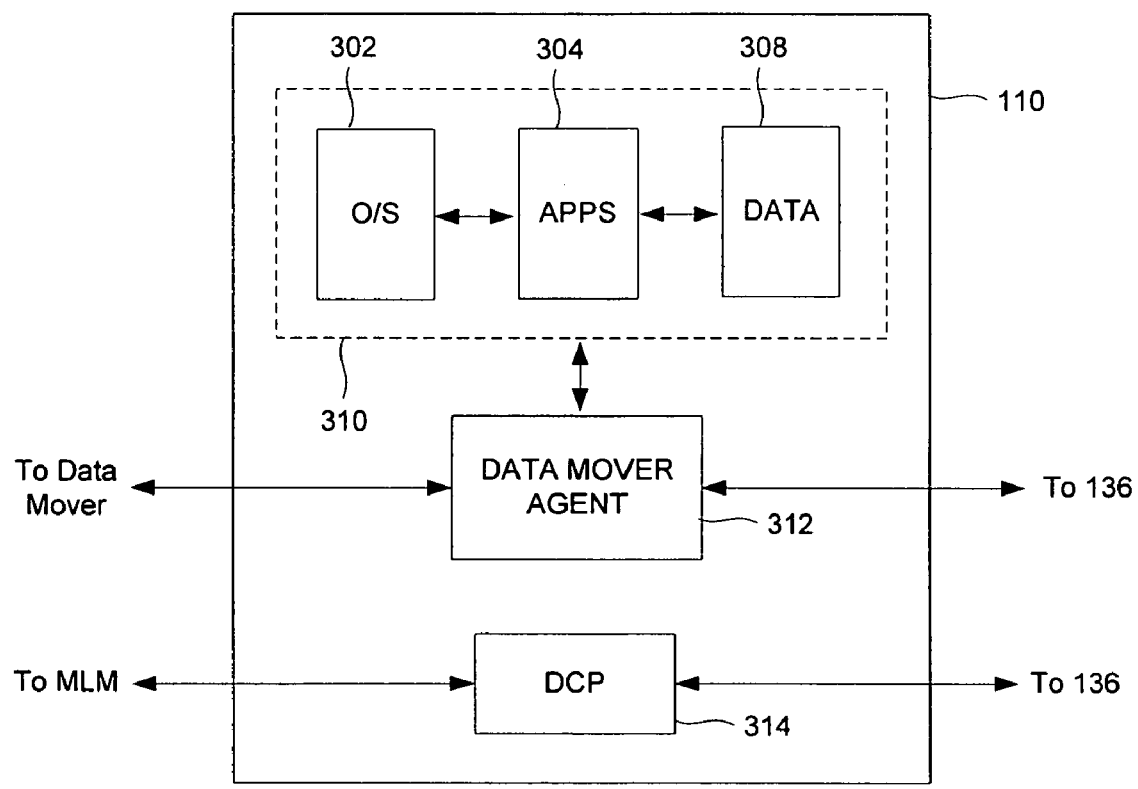
FIG. 3 is a block diagram illustrating one embodiment of a server.

FIG. 3 is a block diagram illustrating one embodiment of a server, such as server Y (110) from FIG. 1A. In this example, server 110 is shown to include an operating system 302, applications 304, and data 308, which serve the primary functionality 310 of server 110. Data mover agent 312 resides on server 110 to allow data mover A (i.e., the data mover on server A) to control a storage device (e.g., tape drive 130) associated with server 110. In some embodiments, the entire data mover resides on server 110 and data mover agent 312 is the entire data mover application. In some embodiments, server 110 includes more than one data mover agent, depending on how many data movers are configured to manipulate data on server 110. For example, in the case of server X (108) of FIG. 1A, each of data movers A and B would have an agent installed on server X, because each is configured to move data to/from server X.

DCP 314 resides on server 110 to allow a properly configured application or device, such as MLM 138, to control a storage device (such as tape drive 130) associated with server 110. For example, DCP 314 may receive and generate in response to a command from MLM 138 or data mover agent 312 a control message to control tape drive 130 as required, e.g., to cause the drive to eject a tape. In the example shown in FIG. 1A, the DCP 314 may be configured to communicate with drive 130, e.g., via SAN 136.

In some embodiments, data mover agent 312 and DCP 314 are connected to network 102 using a network interface card or other appropriate device. Thus data mover agent 312 and DCP 314 can communicate over the network with an associated data mover and the MLM, respectively.

Figure 4:
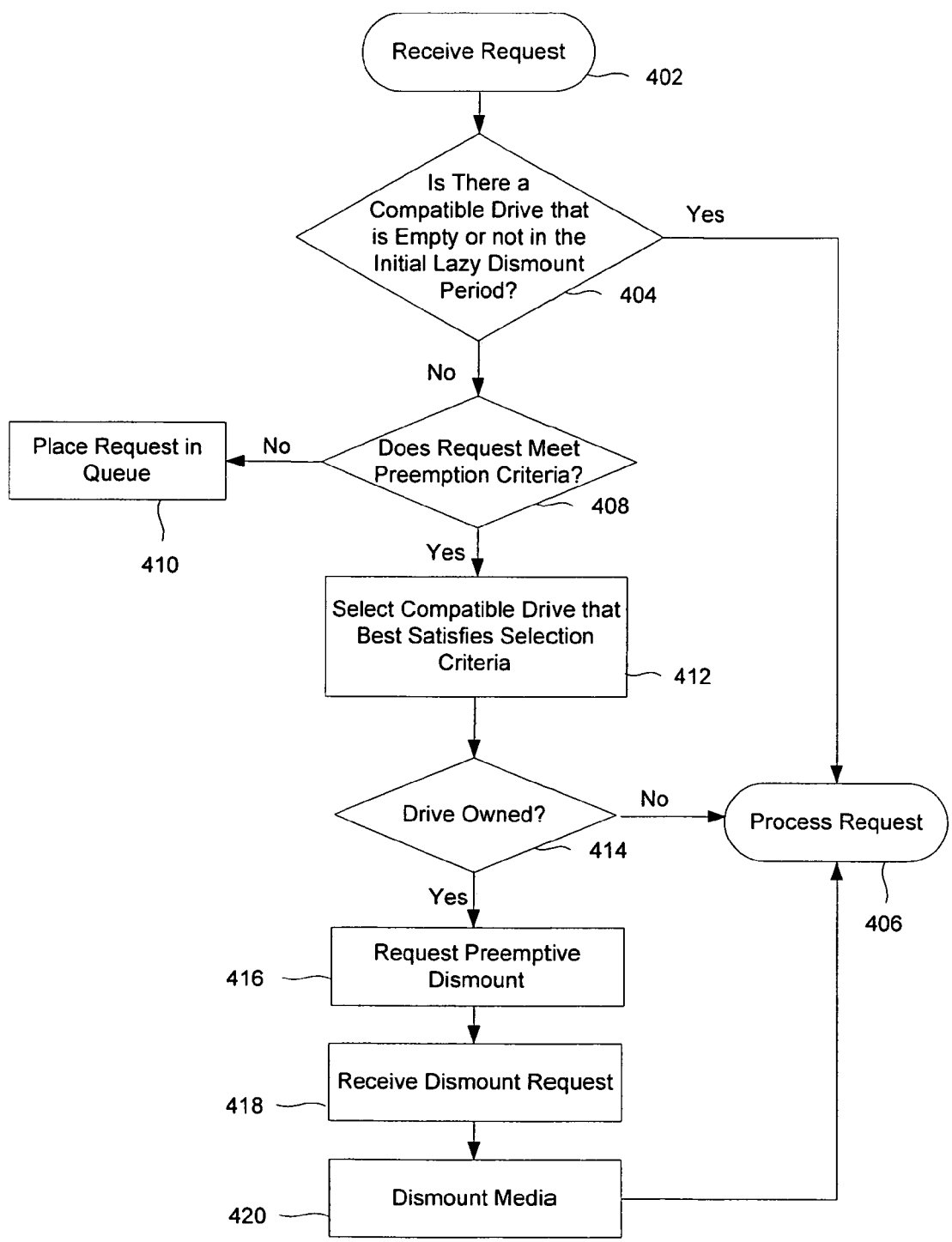
FIG. 4 is a flowchart illustrating a method used in one embodiment to process a media request associated with a storage device.

FIG. 4 is a flowchart illustrating a method used in one embodiment to process a media request associated with a storage device. The process shown in FIG. 4 may be implemented, for example, on a media and library manager such as MLM 138 from FIG. 1. Although a tape and a drive are sometimes described in this example, any type of storage media and storage device may be used. A request requiring use of a storage device is received (402). For example, the request may be to mount a specified tape on a designated drive, or the request may be to mount a specified tape on any compatible drive accessible from a given host, in which case any compatible drive may be used to service the request. For example, if the request is to mount a specified tape on any compatible drive accessible from server 108, any one of drives 130-134 may be used to service the request, assuming each of drives 130-134 is compatible with the media (e.g., tape) to be used. In some embodiments, the request comes from a data mover in real time. A "data mover", as used herein, includes an application, process, or system configured to cause data to be written to and/or read from one storage location to another, such as by causing data to be written to a volume of removable storage media from memory or other storage associated with a host or read from such a volume by a host. In some embodiments, the request comes from a queue, such as the queue described in U.S. patent application Ser. No. 10/883,624, which is incorporated by reference above.

It is determined whether there is a compatible drive that is either empty or not in an initial lazy dismount period (404). If there is a compatible drive that is empty, the request can be processed (406), e.g., in the case of a mount request, the requested tape is mounted on the empty drive. If there is a compatible drive that is not in an initial lazy dismount period, the request can be processed (406). In this example, a drive is in an initial lazy dismount period for a prescribed period during which it is considered not available to service other requests. In some embodiments, this gives the data mover that just sent a request to dismount the drive the opportunity to continue using the drive, and perhaps the tape already mounted on the drive, for a subsequent operation by sending a subsequent mount request with respect to the tape and/or drive. Before the initial lazy dismount period expires, the tape can only be dismounted by a preemptive dismount request, as more fully described below. After the initial lazy dismount period expires, the tape will remain in the drive for a further lazy dismount period but can be dismounted to service a request that needs the drive during the further lazy dismount period. In some embodiments, once the further lazy dismount period has expired, the tape is dismounted and returned to its home shelf. For example, the MLM may dismount the tape at its next available opportunity, e.g., to speed up future mounts. The initial and/or further lazy dismount periods may be maintained by a timer or using other means (e.g., for each dismount request received, the MLM could store the time when the initial lazy dismount period expires and the time when the further lazy dismount period expires). In one embodiment, the dismount request is placed in a queue, but not serviced until the further lazy dismount period has expired (e.g., the request is moved up the queue at that time). The queue could also be consulted to determine whether the initial lazy dismount period has expired. Thus, if it is determined in step 404 that there is a compatible drive that is not in the initial lazy dismount period, the request is processed (406) even if the drive has a tape in it, as it would during a further lazy dismount period. For example, in the case of a mount request for which a compatible drive that is in a further lazy dismount period is identified, the tape in the drive can be dismounted from the drive and the requested tape mounted on the drive. If the required media volume is already in the drive, a dismount is not needed and the processing of step 406 in such a case may be limited to recognizing that the required tape is already in a compatible drive and notifying the data mover that the mount request has been completed. In this case, the processing may include notifying the data mover that the operation is complete.

If all compatible drives are in use or in an initial lazy dismount period, it is determined whether the request meets preemption criteria (408). For example, high priority mount or dismount requests, such as those required during a data recovery process, can be configured to meet such criteria. If the request does not meet preemption criteria, the request is placed in a queue (410), e.g., for servicing at a later time. If the request does meet preemption criteria, i.e., it is a request in favor of which it may be appropriate to preempt another request that is being serviced, a compatible drive that is the selection criteria established to determine which request that is currently being serviced should be preempted is selected (412). For example, a drive currently servicing a lower priority request may better satisfy the selection criteria than a drive that is currently servicing a higher priority request. A drive that is not owned may better satisfy the selection criteria than a drive that is owned. A drive that has been owned for a longer period of time may better satisfy the selection criteria than a drive that has been owned for a shorter period of time. As such, a drive that is currently servicing the lowest priority request or has owned the drive the longest may be selected. In some embodiments, a drive that has not yet been owned for a preconfigured minimum amount of time cannot be preempted. Any other appropriate selection criteria may be used. For example, all else being equal, a drive that already contains the media volume required to satisfy the request may be selected over a drive that contains another media volume.

It is determined whether the selected drive is owned (414). As used herein, a drive is considered to be "owned" if it has been reserved for use by a particular application, system, or process, such as by a particular data mover, e.g., to permit the owner to perform some operation using the drive. In some embodiments, a data mover requesting that a tape be mounted to a drive for purposes of moving data to the tape, owns the drive from the time when the tape is mounted to the drive (e.g., when the MLM processes the mount request) to the time when the MLM receives the corresponding dismount request. If the selected drive is not owned, the request is processed (406). If this is the case, the drive may be in the initial lazy dismount period (as maintained by the MLM). In the case of a mount request under circumstances in which the drive selected in step 412 is not owned but has a tape in it, e.g., because it is in the initial lazy dismount period, the tape is dismounted from the drive, overriding the initial lazy dismount period, and the requested tape mounted on the drive. If the required media volume is already in the drive, a dismount is not needed and the processing performed in step 406 comprises terminating the initial lazy dismount period and informing the data mover that the mount request has been completed.

If the selected drive is owned (414), a preemptive dismount request is sent to the data mover or other application or system that currently owns the drive (412). In this case, the drive could be in use or the data mover could be holding the drive in a lazy dismount state of its own. In one embodiment, the preemptive dismount request is sent to a data mover to be processed, as described more fully below. A dismount request is received (418). The preemptive dismount request may be one sent from the data mover in response to the preemptive dismount request, as described more fully below, or it may simply be one received after the data mover finished its operation and/or its lazy dismount period, if applicable, e.g., if the data mover did not, could not, or was not configured to terminate its operation and/or lazy dismount period early in response to receiving the preemptive dismount request. If a tape other than the tape required to satisfy the request is in the drive, the media volume is preemptively dismounted (420), overriding any lazy dismount period on the MLM and the request in favor of which the preemptive dismount was requested is processed (406). If the required media volume is already in the drive, the processing performed in step 406 does not require either a dismount or a mount.

Figure 5:
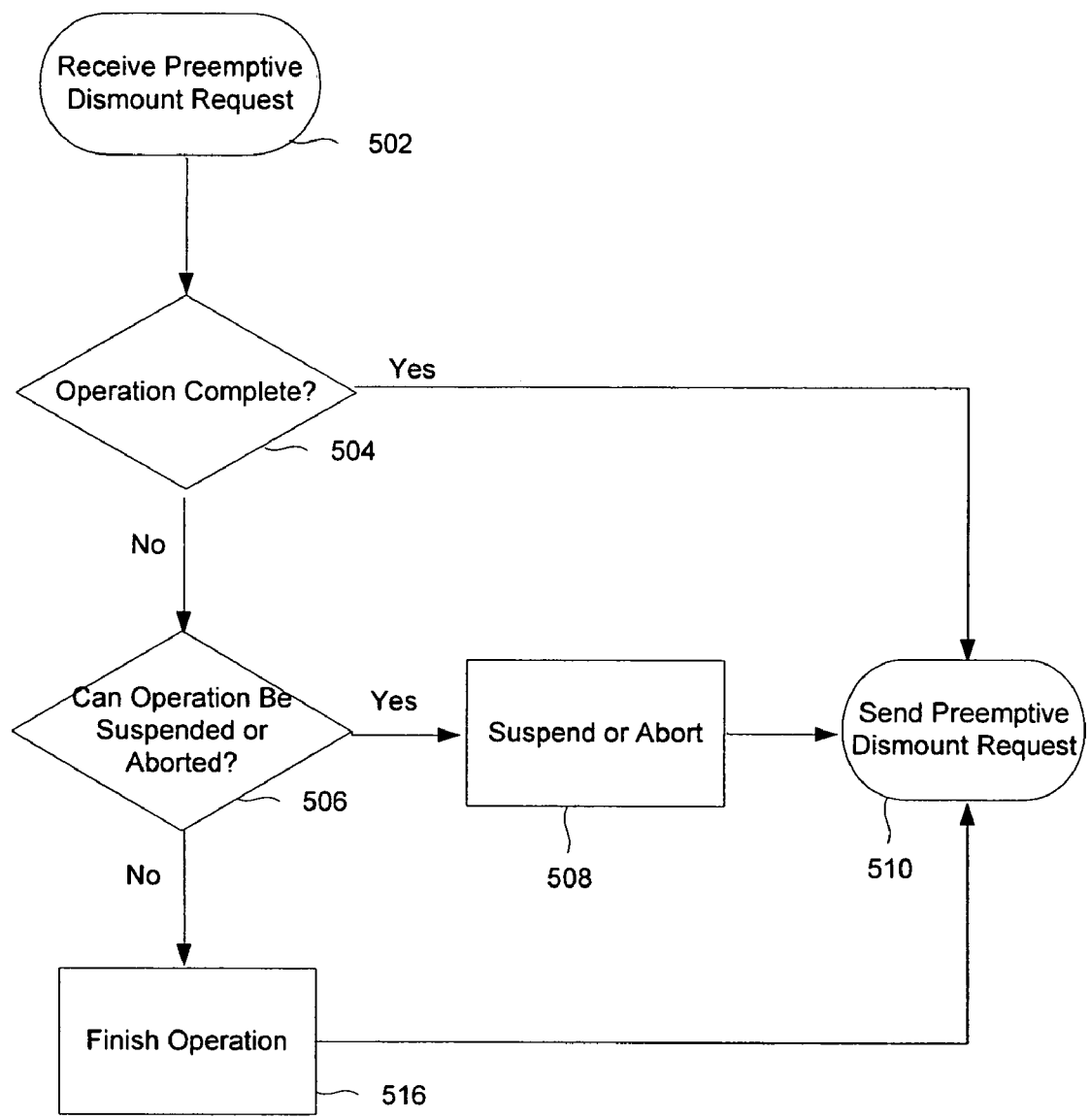
FIG. 5 is a flowchart illustrating a method used in one embodiment to preemptively dismount media from a storage device.

FIG. 5 is a flowchart illustrating a method used in one embodiment to preemptively dismount media from a storage device. The process shown in FIG. 5 is implemented, for example, on a data mover such as data mover 104 of FIG. 1. In one embodiment, the process shown in FIG. 5 is the data mover's response to receiving the preemptive dismount request sent in step 412 of FIG. 4. In this example, a preemptive dismount request is received (502). For example, the preemptive dismount request may be received from the MLM, as described above. It is determined whether an operation associated with the storage device is complete (504). For example, a write operation (e.g., to a tape in a tape drive) may currently be in progress. If the operation is complete, a preemptive dismount request is sent (510). In this case, the data mover could be holding the storage device in a lazy dismount state, i.e., a tape is mounted in the drive but not currently in use. Thus, the preemptive dismount request is sent immediately, overriding the data mover's lazy dismount period (e.g., the data mover may send the preemptive dismount request to the MLM). In some embodiments, the preemptive dismount request may be a standard dismount request that contains a flag or other identifier, to inform the MLM that the request is being sent in response to a preemption request from the MLM. In some such embodiments, the MLM recognizes that the dismount request is a preemptive dismount request based on the nature and/or information in the dismount request that the request was sent in response to a preemption request and on that basis the MLM services the request without delay (e.g., without placing the request in the queue and requiring that it wait its turn and without waiting for any lazy dismount period the MLM may be configured to observe). In other embodiments, a normal dismount request is sent in step 510 and the MLM is configured to recognize by some logic or mechanism other than receiving a special type of dismount request that the request relates to a resource or operation with respect to which it previously sent a preemption request.

If the operation is not complete, it is determined whether the operation can be suspended or aborted (506). Such a determination may be based, for example, on whether it is physically possible to suspend or abort the operation or based on preconfigured preemption rules. For example, a low priority operation may be configured to be suspended when possible and aborted when suspension is not possible. A medium priority operation may be configured to be suspended when possible, but only aborted when the relative priority of the preemptive dismount request is higher than that of the operation. If the operation can be suspended or aborted, the operation is suspended or aborted (508) and a preemptive dismount request is sent (510), e.g., to the MLM. If the operation cannot be suspended or aborted, the process waits until the operation is finished (516) and then sends a preemptive dismount request (510). In some alternative embodiments not shown in FIG. 5, if an operation cannot immediately be suspended or aborted, the process waits until the operation either has been completed or can be suspended or aborted. If before it is finished the operation reaches a point at which it can be suspended or aborted, it is suspended or aborted, as applicable, and a preemptive dismount request is sent. For example, in such an embodiment if the operation is currently in the process of writing data to a tape, the process may wait until the data is finished being written before suspending the operation. If the operation never reaches a point at which it can be suspended or aborted, a preemptive dismount request is sent once the operation is finished.

While the foregoing embodiments focus on media management in the context of backup applications and computer networks, those of ordinary skill in the art will recognize that the same techniques may be used in other contexts and with respect to devices, libraries, and media other than those discussed in detail herein.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of processing a request requiring that a first volume of removable storage media be mounted on a storage device, comprising:
   determining whether the storage device is available;
   in the event it is determined that the storage device is not available because it currently has mounted on it a second volume of removable storage media associated with a data mover:
      determining whether the data mover should be asked to permit the second volume to be removed from the storage device so that the first volume can be mounted thereon; and
      prompting the data mover, in the event it is determined that the data mover should be asked to permit the second volume to be removed from the storage device so that the first volume can be mounted thereon, to provide an indication that the second volume may be dismounted from the storage device;
   wherein in the event it is determined that the data mover should be asked to permit the second volume to be removed, further including selecting as the storage device a compatible storage device that best satisfies preemption criteria; and a storage device servicing a lower priority request better satisfies the preemption criteria than a storage device servicing a higher priority request.

2. The method of claim 1, further comprising:
   receiving from the data mover an indication that the second volume may be dismounted from the storage device; and
   dismounting the second volume from the storage device in response to the indication.

3. The method of claim 2, wherein the second volume is dismounted from the storage device immediately upon receiving the indication.

4. The method of claim 1, wherein the data mover is a first data mover and the request requiring that the first volume of removable storage media be mounted on the storage device is associated with a second data mover.

5. The method of claim 1, wherein the second volume of removable storage media was mounted on the storage device in response to a prior request from the data mover.

6. The method of claim 1, wherein the request comprises a first request, the second volume was mounted on the storage device in response to a second request received previously from the data mover, and determining whether the data mover should be asked to permit the second volume to be removed from the storage device so that the first volume can be mounted thereon comprises determining whether the first request is of a higher priority than the second request.

7. The method of claim 1, wherein the indication comprises a request to dismount the second volume from the storage device.

8. The method of claim 1, wherein the indication comprises a request to dismount the second volume from the storage device without delay.

9. The method of claim 1, wherein the storage device is a tape drive and the media volume is a tape.

10. The method of claim 1, wherein the storage device is an optical drive and the media volume is an optical disk.

11. The method of claim 1, wherein the data mover is configured to respond to a prompt to provide an indication that a volume of removable storage media associated with the data mover may be dismounted from a storage device by:
   determining whether an operation associated with the volume is finished; and
   in the event it is determined that the operation is finished, providing an indication that the volume of removable storage media may be dismounted.

12. The method of claim 1, wherein the storage device is any storage device that is compatible with the first volume of media and accessible from a host associated with the request.

13. The method of claim 1, wherein the available storage device includes an empty storage device.

14. The method of claim 1, wherein the available storage device includes a storage device in an initial lazy dismount period.

15. The method of claim 1, in the event it is determined that the data mover should be asked to permit the second volume to be removed, further including selecting as the storage device a compatible storage device that best satisfies the preemption criteria.

16. The method of claim 1, wherein a storage device that is not owned better satisfies the preemption criteria than a storage device that is owned.

17. A method of processing a request requiring that a first volume of removable storage media be mounted on the storage device, comprising:
determining whether the storage device is available;
in the event it is determined that the storage device is not available because it currently has mounted on it a second volume of removable storage media associated with a data mover:
determining whether the data mover should be asked to permit the second volume to be removed from the storage device so that the first volume can be mounted thereon; and
prompting the data mover, in the event it is determined that the data mover should be asked to permit the second volume to be removed from the storage device so that the first volume can be mounted thereon, to provide an indication that the second volume may be dismounted from the storage device;
wherein the data mover is configured to respond to a prompt to provide an indication that a volume of removable storage media associated with the data mover may be dismounted from a storage device by:
determining whether an operation associated with the volume is finished; and
in the event it is determined that the operation is finished, providing an indication that the volume of removable storage media may be dismounted; and
determining, in the event it is determined that the operation is not finished, whether the operation can be suspended; and
in the event it is determined that the operation can be suspended:
suspending the operation; and
providing an indication that the volume of removable storage media may be dismounted.

18. The method of claim 17, wherein the data mover is further configured to determine, in the event it is determined that the operation is not finished and cannot be suspended, whether the operation can be aborted and, in the event it is determined the operation can be aborted, abort the operation and provide an indication that the volume of removable storage media may be dismounted.

19. The method of claim 18, wherein the data mover is further configured to respond to a prompt to provide an indication that a volume of removable storage media associated with the data mover may be dismounted from the storage device by ignoring the prompt if it is determined that the operation is not finished and cannot be suspended or aborted.

20. The method of claim 18, wherein the data mover is further configured to respond to a prompt to provide an indication that a volume of removable storage media associated with the data mover may be dismounted from a storage device by:
in the event that the operation cannot be suspended or aborted, waiting for the operation to finish.

21. The method of claim 18, wherein the data mover is further configured to respond to a prompt to provide an indication that a volume of removable storage media associated with the data mover may be dismounted from the storage device by:
in the event that the operation cannot be suspended or aborted:
waiting until the operation can be suspended or aborted; and
suspending or aborting the operation.

22. The method of claim 18, wherein determining whether the operation can be suspended or aborted includes consulting preconfigured preemption rules.

23. The method of claim 18, wherein determining whether the operation can be suspended or aborted includes determining an importance of the operation relative to the importance of a second operation with which the prompt is associated.

24. A method of processing a request requiring that a first volume of removable storage media be mounted on a storage device, comprising:
determining whether the storage device is available;
in the event it is determined that the storage device is not available because it currently has mounted on it a second volume of removable storage media associated with a data mover:
determining whether the data mover should be asked to permit the second volume to be removed from the storage device so that the first volume can be mounted thereon; and
prompting the data mover, in the event it is determined that the data mover should be asked to permit the second volume to be removed from the storage device so that the first volume can be mounted thereon, to provide an indication that the second volume may be dismounted from the storage device;
wherein in the event it is determined that the data mover should be asked to permit the second volume to be removed, further including selecting as the storage device a compatible storage device that best satisfies preemption criteria; and a storage device that has been owned for a longer period of time better satisfies the preemption criteria than a storage device that has been owned for a shorter period of time.

25. A system for processing a request requiring that a first volume of removable storage media be mounted on a storage device, comprising:
a processor configured to:
determine whether the storage device is available;
in the event it is determined that the storage device is not available because it currently has mounted on it a second volume of removable storage media associated with a data mover:
determine whether the data mover should be asked to permit the second volume to be removed from the storage device so that the first volume can be mounted thereon; and
prompt the data mover, in the event it is determined that the data mover should be asked to permit the second volume to be removed from the storage device so that the first volume can be mounted thereon, to provide an indication that the second volume may be dismounted from the storage device; and
a memory that is coupled with the processor, wherein the memory provides the processor with instructions;
wherein in the event it is determined that the data mover should be asked to permit the second volume to be removed, further including selecting as the storage device a compatible storage device that best satisfies preemption criteria; and a storage device servicing a lower priority request better satisfies the preemption criteria than a storage device servicing a higher priority request.

26. The system of claim 25, wherein the processor is further configured to:
receive from the data mover an indication that the second volume may be dismounted from the storage device, and
dismount the second volume from the storage device in response to the indication.

27. The system of claim 25, wherein the data mover is a first data mover and the request requiring that the first volume of removable storage media be mounted on the storage device is associated with a second data mover.

28. The system of claim 25, wherein the second volume of removable storage media was mounted on the storage device in response to a prior request from the data mover.

29. The system of claim 25, wherein the request comprises a first request, the second volume was mounted on the storage device in response to a second request received previously from the data mover, and determining whether the data mover should be asked to permit the second volume to be removed from the storage device so that the first volume can be mounted thereon comprises determining whether the first request is of a higher priority than the second request.

30. The system of claim 25, wherein the indication comprises a request to dismount the second volume from the storage device.

31. The system of claim 25, wherein the indication comprises a request to dismount the second volume from the storage device without delay.

32. The system of claim 25, wherein the storage device is a tape drive and the media volume is a tape.

33. The system of claim 25, wherein the storage device is an optical drive and the media volume is an optical disk.

34. The system of claim 25, wherein the data mover is configured to respond to a prompt to provide an indication that a volume of removable storage media associated with the data mover may be dismounted from a storage device by:
determining whether an operation associated with the volume is finished; and
in the event it is determined that the operation is finished, providing an indication that the volume of removable storage media may be dismounted.

35. The system of claim 25, wherein the storage device is any storage device that is compatible with the first volume of media and accessible from a host associated with the request.

36. The system of claim 25, wherein the available storage device includes an empty storage device.

37. The system of claim 25, wherein the available storage device includes a storage device in an initial lazy dismount period.

38. The system of claim 25, wherein in the event it is determined that the data mover should be asked to permit the second volume to be removed, the processor selects as the storage device a compatible storage device that best satisfies the preemption criteria.

39. A computer program product for processing a request requiring that a first volume of removable storage media be mounted on a storage device, the computer program product being embodied in a computer readable storage medium and comprising computer instructions for:
determining whether the storage device is available;
in the event it is determined that the storage device is not available because it currently has mounted on it a second volume of removable storage media associated with a data mover:
determining whether the data mover should be asked to permit the second volume to be removed from the storage device so that the first volume can be mounted thereon; and
prompting the data mover, in the event it is determined that the data mover should be asked to permit the second volume to be removed from the storage device so that the first volume can be mounted thereon, to provide an indication that the second volume may be dismounted from the storage device;
wherein in the event it is determined that the data mover should be asked to permit the second volume to be removed, further including selecting as the storage device a compatible storage device that best satisfies preemption criteria; and a storage device servicing a lower priority request better satisfies the preemption criteria than a storage device servicing a higher priority request.

40. The computer program product of claim 39, further comprising:
receiving from the data mover an indication that the second volume may be dismounted from the storage device; and
dismounting the second volume from the storage device in response to the indication.

41. The computer program product of claim 39, wherein the data mover is a first data mover and the request requiring that the first volume of removable storage media be mounted on the storage device is associated with a second data mover.

42. The computer program product of claim 39, wherein the second volume of removable storage media was mounted on the storage device in response to a prior request from the data mover.

43. The computer program product of claim 39, wherein the request comprises a first request, the second volume was mounted on the storage device in response to a second request received previously from the data mover, and determining whether the data mover should be asked to permit the second volume to be removed from the storage device so that the first volume can be mounted thereon comprises determining whether the first request is of a higher priority than the second request.

44. The computer program product of claim 39, wherein the indication comprises a request to dismount the second volume from the storage device.

45. The computer program product of claim 39, wherein the indication comprises a request to dismount the second volume from the storage device without delay.

46. The computer program product of claim 39, wherein the storage device is a tape drive and the media volume is a tape.

47. The computer program product of claim 39, wherein the storage device is an optical drive and the media volume is an optical disk.

48. The computer program product of claim 39, wherein the data mover is configured to respond to a prompt to provide an indication that a volume of removable storage media associated with the data mover may be dismounted from the storage device by:
determining whether an operation associated with the volume is finished; and in the event it is determined that the operation is finished, providing an indication that the volume of removable storage media may be dismounted.

49. The computer program product of claim 39, wherein the storage device is any storage device that is compatible with the first volume of media and accessible from a host associated with the request.

50. The computer program product of claim 39, wherein the available storage device includes an empty storage device.

51. The computer program product of claim 39, wherein the available storage device includes a storage device in an initial lazy dismount period.

52. The computer program product of claim 39, in the event it is determined that the data mover should be asked to permit the second volume to be removed, further including selecting as the storage device a compatible storage device that best satisfies the preemption criteria.

* * * * *